June 27, 1950　　　　　　G. DEAKIN　　　　　　2,512,612
CHAIN DRIVE FOR UNIVERSAL SELECTORS
Filed Sept. 14, 1946　　　　　　　　　　　　4 Sheets-Sheet 1
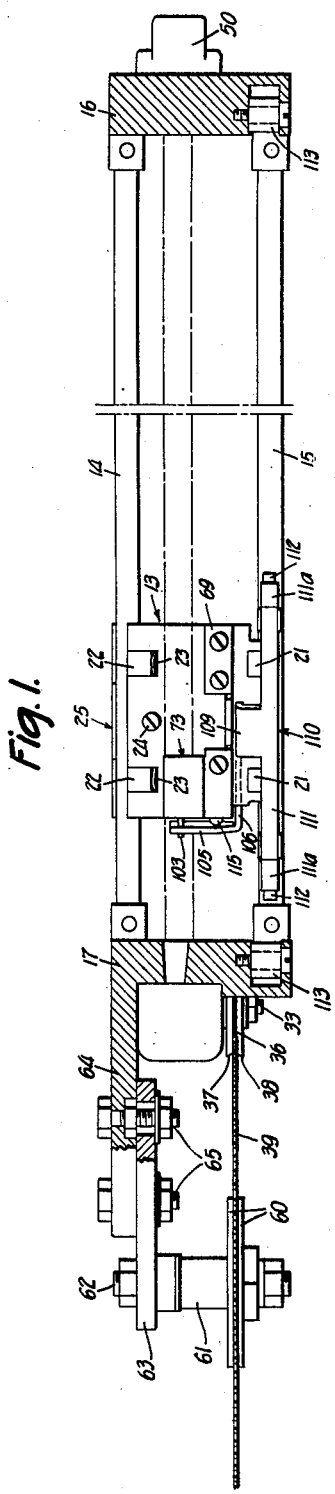
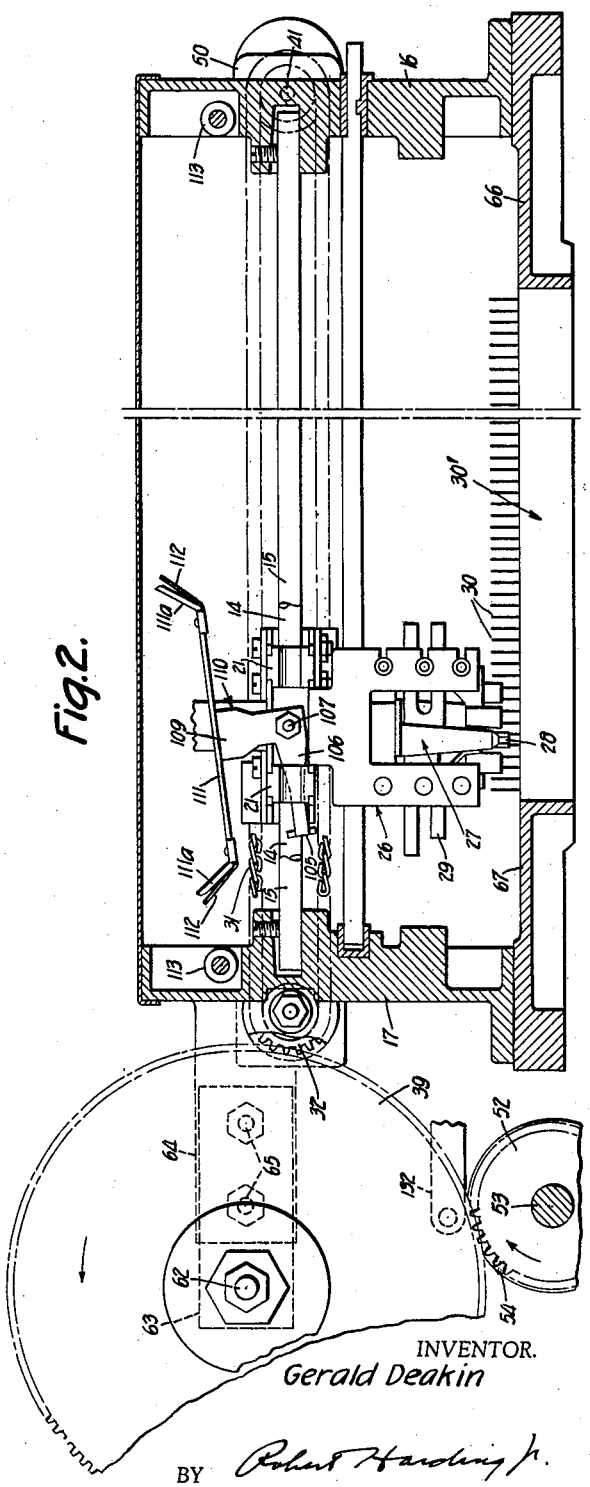
INVENTOR.
Gerald Deakin
BY Robert Harding Jr.
ATTORNEY June 27, 1950　　　　　　G. DEAKIN　　　　　　2,512,612
CHAIN DRIVE FOR UNIVERSAL SELECTORS
Filed Sept. 14, 1946　　　　　　　　　　　　　　4 Sheets-Sheet 2
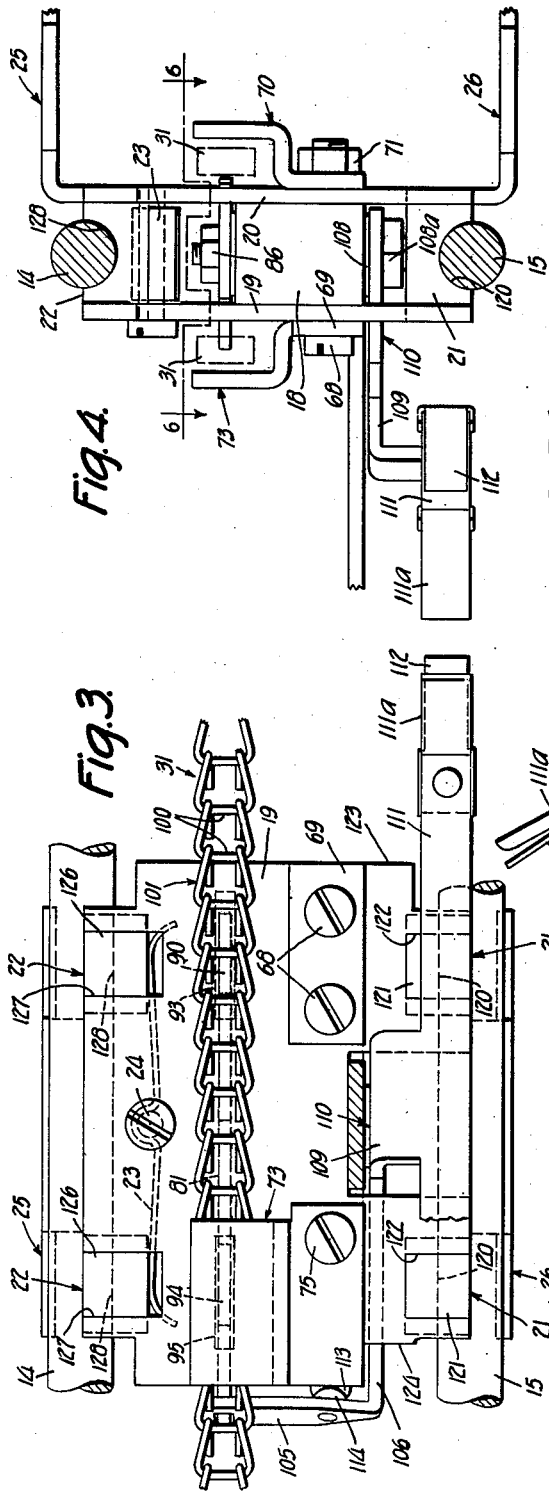
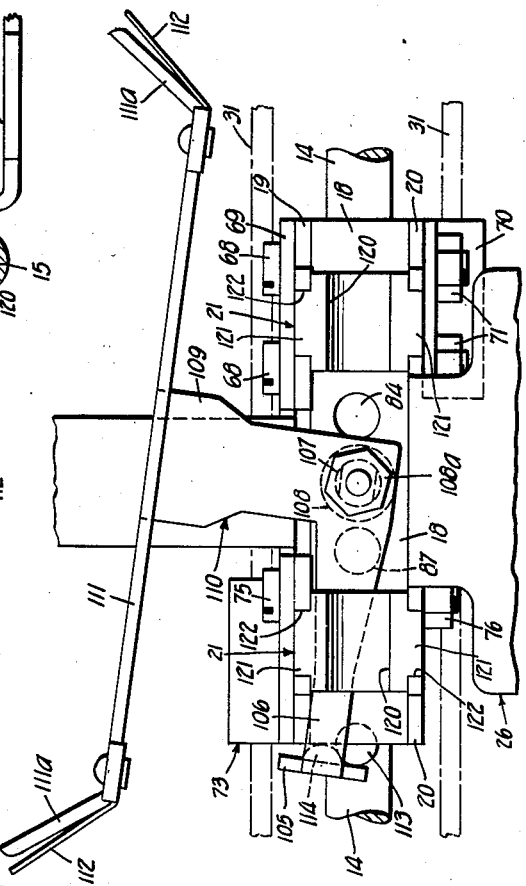
INVENTOR.
Gerald Deakin
BY Robert Harding Jr.
ATTORNEY

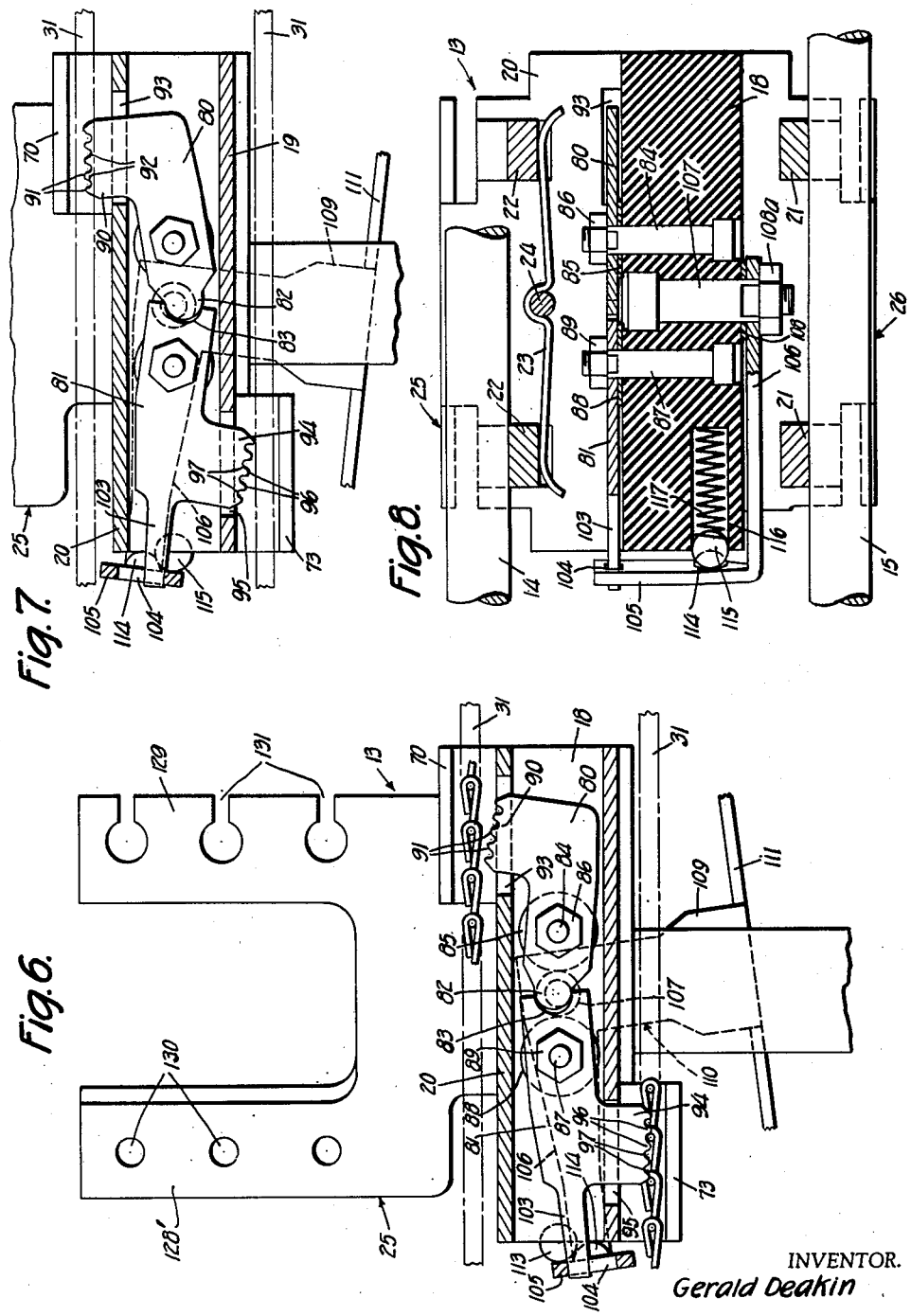

June 27, 1950 G. DEAKIN 2,512,612
CHAIN DRIVE FOR UNIVERSAL SELECTORS
Filed Sept. 14, 1946 4 Sheets-Sheet 4
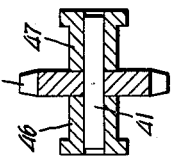
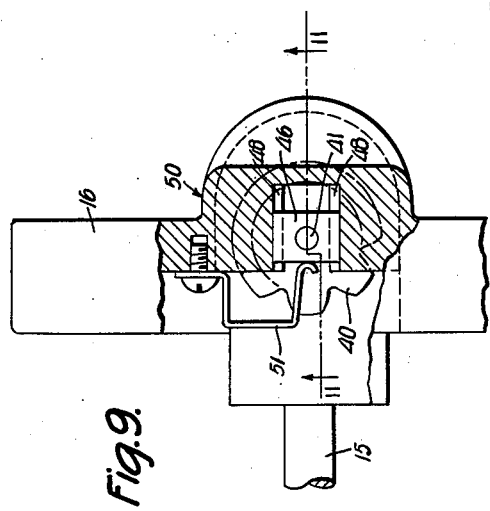
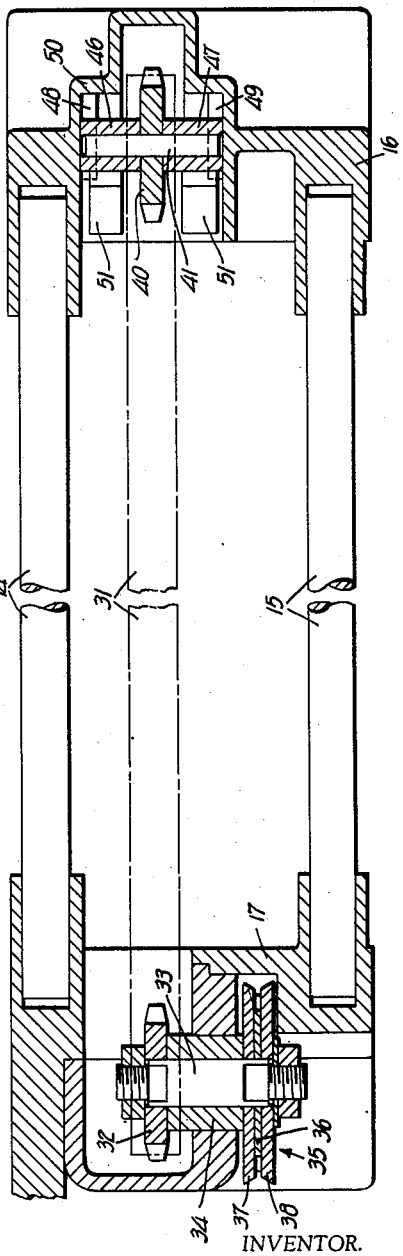
INVENTOR.
Gerald Deakin
BY
ATTORNEY Patented June 27, 1950

2,512,612

UNITED STATES PATENT OFFICE 2,512,612

CHAIN DRIVE FOR UNIVERSAL SELECTORS

Gerald Deakin, New York, N. Y., assignor to International Standard Electric Corporation, New York, N. Y., a corporation of Delaware Application September 14, 1946, Serial No. 697,147

10 Claims. (Cl. 74—37)

This invention relates to means for driving reciprocatory carriages such as brush carriages of selector switches, for example switches of this character used in automatic telephone systems as finder switches, group selectors, final connectors, marking switches or the like.

An important object of the invention is to provide an endless chain drive which is novel and advantageous in construction and operation, which is easy to assemble and economical to manufacture, and which will operate satisfactorily over long periods of service with a minimum of attention.

Another object of the invention is to provide a reciprocatory carriage drive whereby the carriage is reciprocated across a flat terminal bank by connecting said carriage alternately to parallel runs of an endless chain which is operated in one direction only.

Another object of the invention is to provide means for connecting a reciprocatory carriage to either run of an endless chain to impart the corresponding direction of movement to said carriage.

Still another object of the invention is to provide novel and advantageous means for imparting movement to a reciprocatory carriage including an endless flexible element driven in one direction.

Yet another object of the invention is to provide means for actuating a reciprocatory carriage comprising an endless flexible element having parallel runs, means for connecting said carriage alternately to said runs, and novel and advantageous means for shifting said connecting means.

A further object of the invention is to provide driving means for a reciprocatory carriage including an endless flexible element and novel means for mounting the same.

A still further object of the invention is to provide driving means for a reciprocatory carriage including an endless flexible element and novel means for driving the same.

Other objects, features and advantages will appear upon consideration of the following detailed description and of the drawings, in which:

Fig. 1 is a front elevation partly in section of a brush carriage drive unit;

Fig. 2 is a bottom plan view, partly in section, of the device shown in Fig. 1;

Fig. 3 is a fragmentary view on a larger scale of the brush carriage and supporting means of Fig. 1;

Fig. 4 is an end view of the structure of Fig. 3 as viewed from the right;

Fig. 5 is a view on a larger scale of the brush carriage and supporting means shown in Fig. 2 but with the shifting device turned in the opposite direction;

Fig. 6 is a fragmentary top plan view, partly in section, of the brush carriage;

Fig. 7 is a view similar to Fig. 6 but with the clutch shifted in the opposite direction;

Fig. 8 is a fragmentary vertical section;

Fig. 9 is a top plan view of the right end assembly containing the sprocket wheel, partially broken away;

Fig. 10 is a view illustrating the mounting of the right end sprocket; and

Fig. 11 is a view partly in vertical section to illustrate the mounting of the right and left end sprocket wheels.

Referring to the drawings, a brush carriage 13 is slidably mounted on upper and lower rods 14 and 15 respectively. These rods are fixed to end members 16 and 17 respectively, which are parts of the frame of the brush carriage unit. Said brush carriage 13 includes a central block 18 and front and rear plates 19 and 20 respectively. Between the lower ends of said front and rear plates 19 and 20 are blocks 21 with semi-cylindrical grooves receiving the lower rod 15 and between the upper parts of said front and rear plates are slidably mounted blocks 22 having semi-cylindrical grooves at their upper sides to receive the rod 14.

These blocks 22 are pressed against said upper rod 14 by suitable means such as a spring 23 (Fig. 8) looped over a pin 24 supported by said plates 19 and 20, and having its ends engaging the lower parts of said blocks 22. The upper blocks 22 are thus maintained in engagement with the rod 14 under normal conditions. This arrangement also facilitates insertion or removal of a brush carriage, as by upward movement of the carriage to flex the spring 23 and free the lower edge of the carriage, which can then be swung out and the carriage removed. This action can be reversed. The rear plate 20 has at the upper and lower ends of its vertical part rearwardly projecting upper and lower parts 25 and 26 between which is located a brush unit 27 comprising brushes 28 and brush spreaders 29. The brushes cooperate with terminals 30 of a flat terminal bank 30'. The brush unit and the flat terminal bank will not be described further inasmuch as they are described and claimed in my companion application Ser. No. 579,367, filed February 23, 1945, now Patent No. 2,490,035, which issued December 6, 1949.

The brush carriage 13 is driven by an endless chain 31 always moving in the same direction. Carried by the block 18 are devices for connecting the brush carriage 15 with one or the other of the runs of the chain 31. At the left of Fig. 2 and and of Fig. 11, the chain 31 passes around a sprocket 32 fixed on a pin 33 rotatable in a sleeve 34. The sprocket 32 is in a suitable housing 34' carried by the end plate 17 and the sleeve 34 passes through the bottom of the housing and is secured thereto. At the lower end of the said sleeve 34 the pin 33 has fixed thereon a rotatable element 35 which comprises a thin central gear 36 between disks 37 and 38 which serve to maintain engagement between the gear 36 and a flexible driving gear 39.

At the right-hand end of the apparatus the chain passes around a sprocket 40 mounted on a pin 41 which is rotatable in blocks 46 and 47 above and below the same. These blocks are mounted in upper and lower guideways 48 and 49 so that the blocks can slide in one direction to relieve tension on the chain and in the other direction to increase the tension. Said guideways are at the interior of a housing 50 for the right hand sprocket 40. Each of these blocks is urged to the right to tension the chain by means of a spring 51 secured to the housing 50.

As shown in Fig. 2 the flexible drive gear 39 is driven by a gear 52 and a constantly rotating shaft 53. Normally the flexible gear 39 is flexed out of mesh with gear 52 but when a call is started as by dialing, the flexible gear 39 is released and meshes with the said gear 52, being tensioned against a disk 54 or backstop which maintains it in mesh with the gear 52. This arrangement has been used heretofore and is disclosed in my said companion application Ser. No. 579,367. The brush carriage 13 will then travel back and forth until terminal selection is effected, whereupon the flexible gear 39 will be flexed out of mesh with gear 52.

The flexible gear 39 is held at its central portion between two disks 60 fixed to the lower end of a sleeve 61 rotatable on a pivot 62 extending downwardly from a bar 63 beneath and adjustably secured to a flat projection 64 from the end member 17 of the frame of the brush carriage unit. As illustrated, this adjustable connection is effected by means including stud-bolts 65 fitting in openings in projection 64 and passing loosely through openings in bar 63, and suitable nuts on said stud-bolts.

The ends 16 and 17 of the frame of the brush carriage unit are secured in any suitable manner to uprights 66 and 67 of a main frame within which said flat bank 30' is mounted. Other flat banks may be mounted above or below the one shown in the bottom view of Fig. 2. Also additional flat banks 30' facing in the opposite direction may be actuated from said shaft 53 through suitably positioned gears 52 fixed thereon.

As illustrated in Figs. 4, 5 and 6, one run or reach of the chain 31 is just to the front of plate 19 and the other run is just to the rear of plate 20. Just above the lower face of said block 18 and at the right (Fig 3), the plates 19 and 20 are clamped against the opposite faces of block 18 by two bolts 68. These bolts pass through a small plate 69 at the front of plate 19, block 18, plate 20 and the lower plate-like portion of a bracket 70; and are secured in position by means of nuts 71. The bracket 70 has an outset upper part just at the outside of the adjacent reach of the chain 31 to prevent outward movement thereof. At the opposite end of the block, there is a front bracket 73 which is secured to the central block 18 by a bolt 75 and a nut 76 on the shank of the bolt. The bracket 73 has an outset upper part just outside the adjacent run of the chain 31. As will appear more fully hereinafter the guards or outset portions of the brackets act to maintain the adjacent runs of the chain in proper positions relative to chain-holding or chain-grasping means to be described hereinafter.

As illustrated in Figs. 6, 7 and 8, the chain-grasping means comprises a right hand gripping lever 80 pivoted near its left end on said block 18 and a left hand gripping lever 81 pivoted near its right end to said block. At their inner ends said levers have a pivotal connection whereby movement of the outer end of one lever toward one run of the chain will cause a movement of the outer end of the other lever from the other run of the chain. As illustrated, the inner end of lever 80 is narrowed and terminates in a part-circular end 82 projecting into a part-circular recess 83 in the inner end of the other lever 81.

The right hand lever 80 (Figs. 6, 7 and 8) is pivoted on the upper end of the shank of a bolt 84. Said shank extends upwardly through a bore in the block 18, the head of bolt 84 being enclosed in a countersunk recess at the lower end of said bore. Above the upper surface of said block, said shank passes through a washer 85 which serves as a wear plate on which said lever 80 rests, and then through an opening in the lever 80. This lever is held on the shank by a nut 86. The lever 81 is mounted in a similar manner on a bolt 87 passing upwardly through a washer 88 and the lever 81, and having thereon a nut 89 above the lever.

Projecting rearwardly from the outer end of lever 80 is a lug or gripping head 90 having at its rear edge a straight line of rounded-end teeth 91 having rounded-bottom recesses 92 therebetween. The lug 90 projects at all times through an opening 93 in the rear plate 20. Similarly the lever 81 has a lug or gripper head 94 projecting forwardly through an opening 95 in plate 19 and having at its forward edge a straight row of rounded-end teeth 96 with rounded-bottom recesses 97 therebetween. Said straight rows of teeth are so positioned on the levers that they will lie along the runs of the chain when in engagement therewith.

Said straight toothed edges cooperate to advantage with a chain of the type disclosed, in which the links are connected at the edges of the chain and the central portion of the ladder-like structure is made up of cross members or rungs 100, one for each link 101. As illustrated (Fig. 3) each link is formed of a single wire with a broad base 100 and inwardly inclined sides 102 which are turned back around said broad base of the next link. The single wire of any of said broad bases is substantially of the right size to fit in a recess between two of said teeth. Of course, if the chain be under sufficient tension, engagement of a run of the chain by the toothed end of one of said levers would not cause the chain to engage the bracket or guard at the outside thereof. Otherwise the chain would be pressed against the adjacent bracket and the chain would be gripped between the bracket and the toothed end or head of the lever.

Operation of the levers 80 and 81 may be effected by means of a finger 103 (Figs. 6, 7 and 8) projecting from the outer end of lever 81 into an elongated horizontal slot 104 in an upward extension 105 of a generally horizontal lever arm 106 pivoted on the shank of a bolt 107 midway between the bolts 84 and 87 and inserted from above through a suitable bore extending downwardly from a head in a countersunk recess. A washer 108 is located between the lever arm 106 and block 18 and the arm 106 is held on the bolt by a nut 108a. Another lever arm 109 extends forwardly from said lever arm 106 and forms therewith a lever 110. At the front, the lever arm 109 is turned down and supports in a substantially vertical plane a cross member or shifter bar 111 having outwardly inclined ends 111a. At the outer faces of said inclined ends are leaf springs 112 which flare outwardly from said inclined ends.

In the bottom view of Fig. 2 the brush carriage is arranged to move to the left and is connected to the lower run of the endless chain at the rear end of the block. At this time the lower run (Fig. 2) will be moving to the left. The left hand sprocket 32 will be turning clockwise (Fig. 2), the flexible gear 39 will be turning counterclockwise and the driving gear 52 will be turning clockwise. However, if the brush carriage unit were inverted the main shaft would necessarily turn in the counter-clockwise direction.

As the brush carriage 13 approaches the left end of its path, the leading spring 112 will strike a roller 113 on a pin mounted in the frame and will cushion the blow until the spring is flattened against the outer face of the corresponding inclined end 111a of the shifter bar 111. The rocking of the lever 110 about the pivot or bolt 107 will eventually cause one end of slot 104 to engage the finger 103 and shift levers 81 and 80. It should be noted that the trailing gripper lever is always the effective one, which tends to maintain a connection.

The completion of a change of connection is assured by a snap action device. To this end the upturned extension or end of lever arm 106 is provided at the inner surface thereof midway between its edges, with a part sphere 114 adapted to ride over a ball 115 in a bore 116 and urged outwardly by a helical spring 117. It will be evident (Fig. 6) that the clockwise swing of arm 106 and upward projection 105 with slot 104 therein will have no effect on finger 103 until the trailing end of the slot strikes the finger 103 as the part sphere 114 is about to ride over the spring-pressed ball 115. Then the spring-pressed ball will effect a rapid movement of the arm 106 to its final position and gripping of the other reach of the chain to reverse the direction of the carriage 13 from left to right. When the carriage 13 reaches the right hand end of its path, the shifter bar 111 will be swung in the opposite direction by means of a roller 113 at the right of Fig. 2 thus changing the direction of movement from right to left.

The manner of mounting guide-rod-engaging blocks 21 and 22 in the selector carriage 13 is most clearly shown in Figs. 3, 4, 5 and 8. Each block 21 has at its bottom (Figs. 4 and 5) a part-cylindrical groove 120 to fit on the lower guide rod 15, and front and rear tongues 121. The front tongue 121 of each block occupies a slot 122 in one of two downwardly projecting branches 123 and 124 of front plate 19, branch 123 being shown at the right and branch 124 being shown at the left of Fig. 3. The rear tongue 121 of each block occupies a slot 125 in the plate 20.

At the top of the selector carriage, the blocks 22 have at front and back tongues 126 which fit into slots 127 in the front and rear plates 19 and 20. These blocks 22 are urged upwardly by spring 23 to seat guide rod 14 in part-cylindrical grooves 128 in said blocks 22. It should be noted that the slots 127 in plates 19 and 20 should be deep enough to enable the lower blocks 21 to be moved sidewise from the lower guide rod 15 when the carriage is lifted as far as possible against the action of said spring 23.

As mentioned hereinbefore, the brush unit 27 is supported between rearward extensions 25 and 26 from the upper and lower parts respectively of the rear plate 20 of the brush carriage. The central portion of the plate 20 between the lower slots 122 extends downwardly and rearwardly substantially at the level of the top of guide rod 14, there it is widened at 26 and provided with two parallel branches 128' and 129. The branch 128 is provided with three circular openings 130 in a line and the branch 129 is provided with keyhole slots 131 for use in securing the brush unit to the brush carriage. At the upper part of the brush carriage, the central portion of the plate between the upper slots 126 is turned rearwardly at the level of the top of guide rod 14 to provide the part 25 which may be of the general fork shape as the part 26.

The flexible gear 39 may normally be flexed out of mesh with gear 52 by means of an arm 132. However, starting of a call as by dialling will cause relief of the pressure of the arm 132 on flexible gear 39 and meshing of gear 39 with gear 52. The controlling means for the flexible gear may be substantially the same as in my said companion application Ser. No. 579,367. As indicated in Fig. 2 by the position of shifter bar 111, the brush carriage 13 is connected to the lower run of chain 31 (Fig. 2). The brush carriage is then driven to the left until the left hand spring 112 engages the roller 11, thus starting shifting of the shift bar or member 111 and exerting a cushioning action until the spring lies flat against the corresponding inclined end 111a of the shift bar. In this way the entire lever 110 is shifted about pivot 107 until the trailing end of slot 104 engages pin 103 and shifts lever 80 to withdraw the toothed head 90 from the front run of chain 31 and, with the assistance of the snap device comprising a half sphere 114 on end of arm 105 and a spring-supported ball 115, to engage the toothed head 94 with the rear run. As soon as the half sphere 114 passes the center of ball 115, the ball 115 will be moved outwardly by the pressure of the spring 116 and the shifting will be completed with the toothed head 94 in engagement with the other run of the chain. The carriage 13 will travel back and forth in this manner until a brush 28 engages a selector terminal connected to a vacant line, whereupon the flexible gear is shifted out of mesh with the gear 52, thus stopping the carriage in the position at which said connection was completed. The carriage will remain in this position until it is again put into operation by starting a call.

There is a very compact assembly of the central block 18 of the carriage and the chain grasping means due partly to the pivoting of the levers 80 and 81 on the upper edge of the block 18 with the corresponding grasping or gripping heads 90 and 94 in slots or openings 93 and 95 in plates 20 and 19 respectively. Also the operating lever 110 is pivoted on the bottom of said block 18 with its arm 106 extending along the bottom of the block and said upright extension along one end of the block, thus economizing space at the side of the carriage body. Also the snap and detent means including the part spherical projection 114 on extension 105 and the ball 115 pressed outwardly by spring 116, which acts when arm 106 is moved past its central position is located at the end of the block and does not project outwardly beyond the plates 19 and 20.

As will be understood, the chain 31 should be substantially unstretchable.

It should be understood that many changes can be made and that various features may be used without others without departing from the true scope and spirit of the invention.

What is claimed is:

1. The combination of a reciprocatory carriage and means for reciprocating the same including a flexible element with two oppositely movable runs and driven in one direction only, and a pair of gripping levers arranged end to end between said runs and pivoted to said carriage at their inner ends, connections between the inner ends of said gripping levers whereby movement of one of said levers away from the corresponding run will move the other lever toward the other run, a finger extending from the outer end of one lever beyond the end of the carriage, and an actuating lever mounted on said carriage and having an arm movable in a plane parallel to the plane of said gripping levers, said arm having an offset outer end with a lost motion connection to said finger.

2. The combination of a reciprocatory carriage and means for reciprocating the same including a flexible element with two oppositely movable runs and driven in one direction only, and a pair of gripping levers arranged end to end and pivoted on said carriage at their inner ends, a connection between said inner ends whereby movement of one of said levers away from a run will move the other lever toward the other run, operating means for said gripping levers including an arm pivoted on said carriage at a different level and having a pin and slot connection with the outer end of one of said gripping levers, actuating means for said arm including parts operated at the ends of the carriage path to shift said gripping levers and reverse the direction of said carriage.

3. The combination of a reciprocatory carriage and means for reciprocating the same including a flexible element with two oppositely movable runs and driven in one direction only, and a pair of gripping levers arranged end to end and connected at their inner ends whereby movement of one of said levers away from a run will move the other lever toward the other run, operating means for said gripping levers including an arm pivoted on said carriage at a different level and having a pin and slot connection with the outer end of one of said gripping levers, actuating means for said arm including parts at the ends of the carriage path to shift said gripping levers and reverse the direction of said carriage and a snap-over device at the end of the carriage where said arm is connected to a gripping lever to urge the lever to its final position and yieldingly retain it there.

4. In a selector switch for automatic telephone systems and the like, a reciprocatory brush carriage, an endless driving chain having parallel oppositely-moving runs at opposite sides of said carriage and at the level of the top thereof, two gripping levers pivoted at their inner ends on said top and extending in opposite directions along the same, connections between the inner ends of said gripping levers for concomitant movement of said levers in opposite directions, a finger extending outwardly from one of said gripping levers, an arm pivoted on the bottom of said carriage near its center and extending to the end thereof beneath said finger where it has an upward extension, a pin and slot connection between said upward extension and said finger, and means for shifting said arm at the ends of the carriage path to change the connection of the carriage from one run to the other.

5. In a selector switch for automatic telephone systems and the like, a reciprocatory carriage, an endless driving chain having parallel oppositely-moving runs at opposite sides of said carriage, two oppositely extending gripping levers pivoted on said carriage at the level of said runs, connections between the inner ends of said gripping levers for movement in opposite directions, a laterally projecting head at the outer end of each gripping lever with rounded-end low teeth and corresponding rounded bottom depressions therebetween to facilitate rapid engagement and disengagement of the chain and said heads, and means effective at the ends of the carriage path for effecting rapid engagement and disengagement of said heads and chain comprising a finger projecting from one of said gripping levers, an operating lever on said carriage having a slot receiving said pin and shifting the same only when an end of the slot strikes the pin, and detent means pressed back by said operating lever and then acting to complete the lever stroke and retain said operating lever in one of its limiting positions.

6. The combination of a reciprocatory carriage and means for reciprocating the same comprising an endless flexible element with two oppositely-movable parallel runs and means for alternately connecting said carriage to said runs comprising a connection-shifting arm pivoted on said carriage and extending laterally from the carriage path, a transverse shifter member with diverging ends carried by said arm cushion means carried by said ends, and fixed members at the ends of the carriage path to engage said diverging ends alternately and swing said arm accordingly, whereby said member is shifted without vibration.

7. The combination according to claim 6 wherein said cushion means comprises a leaf spring at the outer face of each of said diverging ends and secured to said shifter member with its inner end against the inner end of the corresponding one of said diverging ends and with a free outer end diverging therefrom.

8. The combination according to claim 6 wherein there is a snap-action device for completing the throw of said arm when it is carried past center.

9. The combination of a reciprocatory carriage and means for reciprocating the same including a chain with two oppositely movable runs and driven in one direction only, two chain-gripping members; connections between said chain-gripping members whereby movement of either one toward the corresponding run will move the other away from the other run; a finger connected to said members to operate the same and extending beyond one end of the carriage; an actuating lever pivoted on said carriage and comprising an arm extending along said carriage and beyond the same end as said finger and having a lost motion connection to said finger, and a second arm substantially perpendicular to the first provided at its outer end with a transverse shifter bar with diverging ends, and fixed members at the ends of the carriage path to engage said diverging ends alternately.

10. The combination of a reciprocatory carriage and means for reciprocating said carriage including an endless flexible element with two oppositely moving parallel runs, gripper members on said carriage, one for each element run, means for operating said gripper members alternately to engage said runs including a finger projecting from one end of the carriage and finger operating means including an arm pivoted on said carriage and projecting laterally therefrom, a shifter bar on the outer end of said arm and having diverging ends and fixed members at the ends of the carriage path to engage alternately said diverging ends and change the direction of movement of the carriage.

GERALD DEAKIN.

REFERENCES CITED

The following references are of record in the file of this patent:

UNITED STATES PATENTS

| Number | Name | Date |
|---|---|---|
| 520,827 | Koss | June 5, 1894 |
| 1,285,628 | Craley | Nov. 26, 1918 |
| 1,487,373 | Deakin | Mar. 18, 1924 |
| 1,555,341 | Waters | Sept. 29, 1925 |
| 1,774,356 | Cloud | Aug. 26, 1930 |
| 2,224,431 | Heginbotham et al. | Dec. 10, 1940 |
| 2,415,233 | Brustowsky | Feb. 4, 1947 |